(12) United States Patent
Kisel et al.

(10) Patent No.: US 8,370,426 B2
(45) Date of Patent: Feb. 5, 2013

(54) CONTENT-ON-DEMAND METHOD AND NETWORK THEREFOR

(75) Inventors: Andrey Kisel, Maidenhead (GB); Dave Cecil Robinson, Woodsend Aldbourne (GB)

(73) Assignee: Alcatel Lucent, Paris (FR)

( * ) Notice: Subject to any disclaimer, the term of this patent is extended or adjusted under 35 U.S.C. 154(b) by 335 days.

(21) Appl. No.: 12/665,625

(22) PCT Filed: May 30, 2008

(86) PCT No.: PCT/EP2008/004393
§ 371 (c)(1),
(2), (4) Date: Jun. 10, 2010

(87) PCT Pub. No.: WO2008/155014
PCT Pub. Date: Dec. 24, 2008

(65) Prior Publication Data
US 2010/0250656 A1  Sep. 30, 2010

(30) Foreign Application Priority Data
Jun. 21, 2007 (EP) .................................. 07290771

(51) Int. Cl.
*G06F 15/16* (2006.01)
(52) U.S. Cl. ....................................... 709/203; 709/201
(58) Field of Classification Search .................. 709/201, 709/203
See application file for complete search history.

(56) References Cited

U.S. PATENT DOCUMENTS

| | | | |
|---|---|---|---|
| 7,685,281 B1 * | 3/2010 | Saraiya et al. ................ | 709/226 |
| 2002/0046405 A1 | 4/2002 | Lahr | |
| 2003/0021282 A1 | 1/2003 | Hospodor | |
| 2007/0011260 A1 | 1/2007 | Chiu | |
| 2007/0250636 A1 * | 10/2007 | Stephens ...................... | 709/231 |

OTHER PUBLICATIONS

European Telecommunications Standards Institute 2007: "Telecommunications and Internet Converged Services and Protocols for Advanced Networking (TISPAN): Resource and Admission Control Sub-System (RACS); Functional Architecture; Release 2," Draft ETSI TS 182 019 VO.5.2, XP014037071, pp. 1-84, Apr. 2007.
International Search Report.

\* cited by examiner

*Primary Examiner* — Wing F Chan
*Assistant Examiner* — Andrew Woo
(74) *Attorney, Agent, or Firm* — Fay Sharpe LLP

(57) ABSTRACT

A method is provided of providing a content-on-demand service to a user terminal in a system comprising a plurality of content-on-demand servers and a packet-switched network. The method comprises the steps of: a first of the content-on-demand servers seeking to reserve packet-switched network resources to enable service delivery to the user terminal, said first server sending a message that resource reservation was insufficient, a further of the content-on-demand servers seeking to reserve packet-switched network resources to enable service provision to the user terminal, said further server sending a message that resource reservation is sufficient, and said further server providing the content to the user terminal via the packet-switched network.

14 Claims, 4 Drawing Sheets

CONTENT-ON-DEMAND METHOD AND NETWORK THEREFOR

FIELD OF THE INVENTION

The present invention relates to telecommunications, in particular to delivery systems of content such as video.

DESCRIPTION OF THE RELATED ART

As shown in FIG. 1, in a known network for providing video services such as interactive Internet Protocol Television, IPTV, an application server AS is connected, via that interface, to a central Resource and Admission Control Subsystem (RACS) server. The application server includes a Resource and Admission Control (RAC) interface via which the application server is connected to the RACS server. The application server is also connected to Content-on-Demand (CoD) servers, only one of which is shown in FIG. 1 for simplicity.

In use, the application server receives a Content-on-Demand (CoD) service request from a user terminal (denoted User Equipment, UE, such as a set top box attached to a television set or a digital mobile handset including a screen display). The request is passed to the RACS server which then seeks to reserve appropriate resources of the Internet Protocol network. If resources can be reserved, the RACS server then sends a resource reservation acknowledgement to the application server which then forwards both an acknowledgment of the service request and an identifying address of the CoD server selected to supply the service. This information enables the user terminal to then seek to establish the content-on-demand session. It will thus be seen that the RACS server handles both resource reservation and admission control functions.

In known approaches, the interface to the RACS server may be in the application server, or alternatively in the CoD server, but in either case a central RACS server is contacted. The central RACS server requires detailed knowledge of network topology so as to be effective in reserving appropriate IP network resources.

SUMMARY OF THE INVENTION

The reader is referred to the appended independent claims. Some preferred features are laid out in the dependent claims.

An example of the present invention is a method of providing a content-on-demand service to a user terminal in a system comprising a plurality of content-on-demand servers and a packet-switched network. The method comprises the steps of:

a first of the content-on-demand servers seeking to reserve packet-switched network resources to enable service delivery to the user terminal, said first server sending a message that resource reservation was insufficient, a further of the content-on-demand servers seeking to reserve packet-switched network resources to enable service provision to the user terminal, said further server sending a message that resource reservation is sufficient, and said further server providing the content to the user terminal via the packet-switched network.

In its preferred embodiments, CoD servers are adapted to make resource reservations. If one CoD server cannot make the reservation then another CoD server is instead requested to make the reservation. The content is preferably video.

The order in which the servers are requested to make the reservation can be according to a priority list. The list can be adaptive to take account of operational histories of servers.

In its preferred embodiments, the present invention provides a resilient and adaptive mechanism for resource reservation for interactive Internet Protocol television (IPTV) services, such as video content-on-demand (CoD) services.

As compared to the prior art, the inventor realised that preferred embodiments would be advantageous as they avoid use of a central RACS server and instead distribute resource reservation control functionality. This removed a central point of possible failure and avoided a requirement of the centralised server, namely that if have exact knowledge of network topology.

BRIEF DESCRIPTION OF THE DRAWINGS

An embodiment of the present invention will now be described by way of example and with reference to the drawings, in which.

DETAILED DESCRIPTION

When considering a known system, the inventor realised that it would be useful to remove the central RACS server and instead adapt the Content-on-Demand CoD servers to handle the relevant functionality.

A Network

Figure 1:
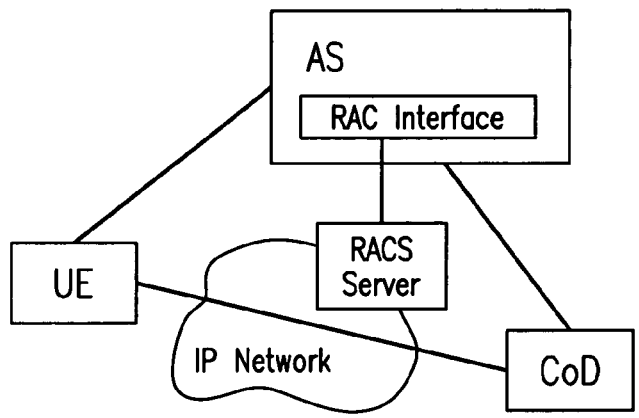
FIG. 1 is a diagram illustrating a known network for interactive IPTV services (PRIOR ART)
Figure 2:
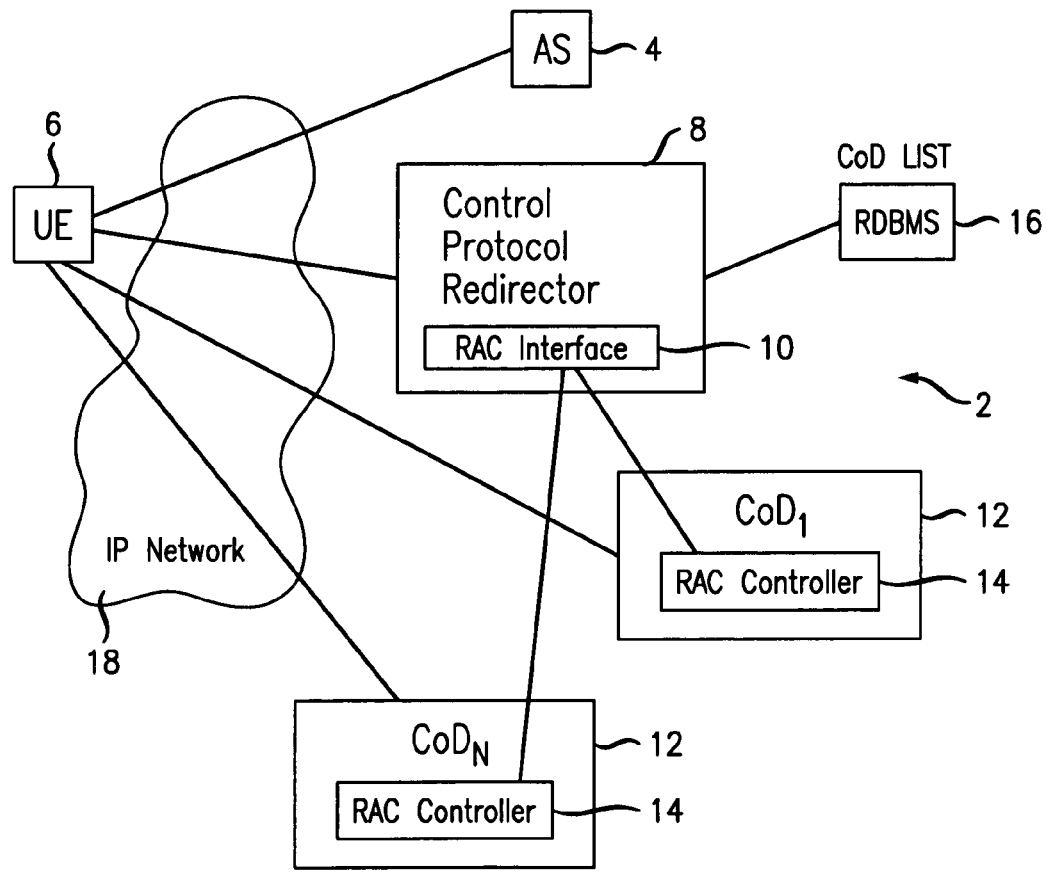
FIG. 2 is a diagram illustrating a network for interactive IPTV services according to a first embodiment of the present invention.

As shown in FIG. 2, a network 2 for interactive IPTV services consists of an application server, AS, 4 connectable to a user terminal, UE, 6. The user terminal is also connectable to a Control Protocol Redirector 8 that includes a Resource and Admission Control (RAC) interface 10. That interface 10 is connected to a series of Content-on-Demand CoD servers, CoD1, . . . CoDn, 12. In this example, each CoD server provides digital multimedia content e.g. video content and may be referred to as a video content-on-demand server or a video-on-demand server. Each CoD server 12 includes a Resource and Admission Control (RAC) controller 14. Each Control Protocol Redirector 8 is also connected to a Relational DataBase Management System (RDBMS) 16 in which a list of CoD servers is stored. The user terminal UE 6 is connected to the CoD servers 12 via an Internet Protocol network 18.

Operation

Figure 3:
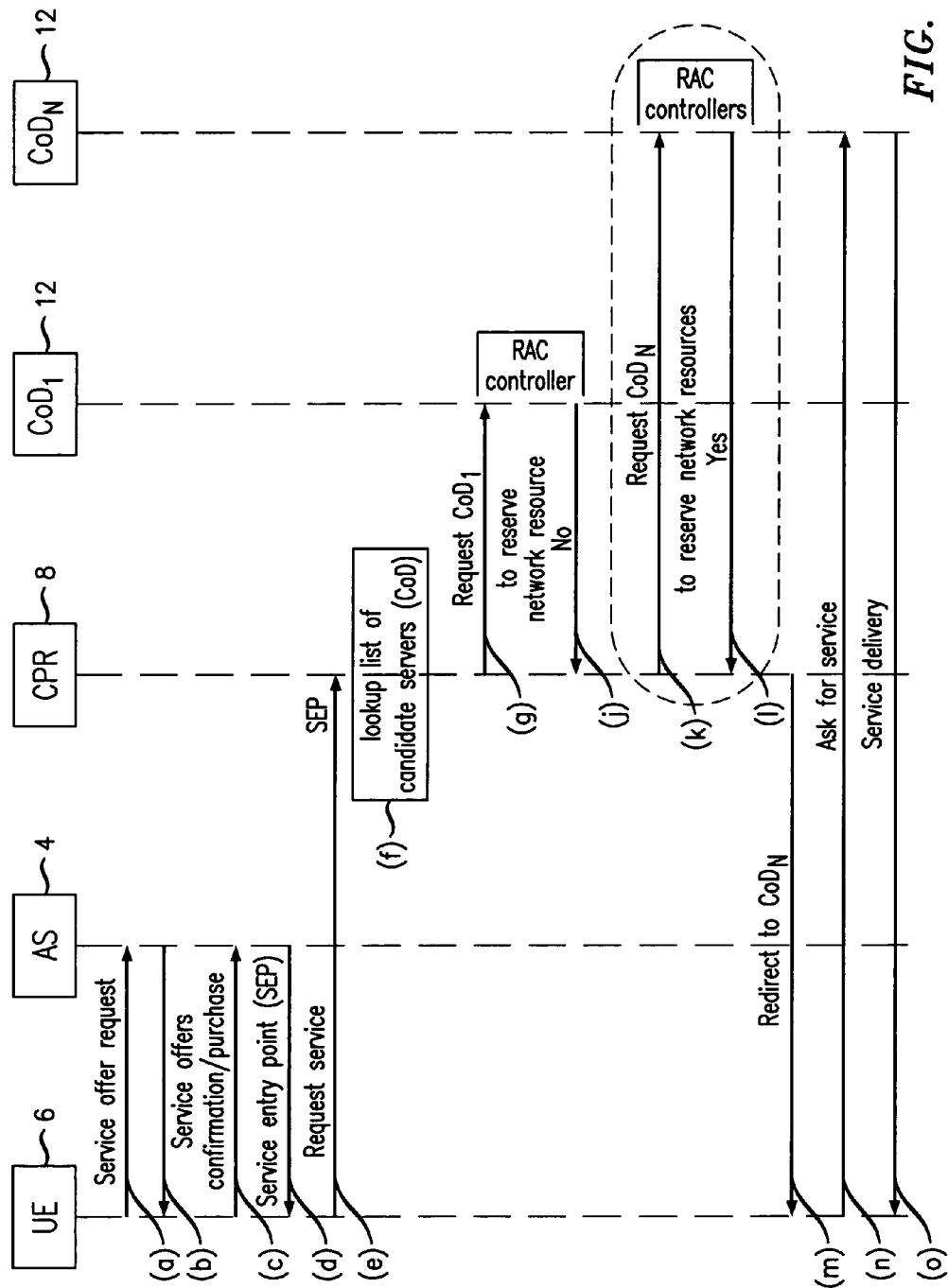
FIG. 3 is a message sequence diagram illustrating reserving network resources so as to provide a requested service in the network shown in FIG. 2.

As shown in FIG. 3, the network 2 operates as follows.

The user terminal 6 first sends (step a) to the application server 4 a request for a particular video stream, such as a video-film, recording of a sports event or other multimedia content. The application server 4 responds by sending (step b) a service request authorisation to the mobile terminal 6, which then sends (step c) a further confirmation back to the application server 4 that the selected content is that desired by the user.

The application server 4 then sends (step d) a service entry point (SEP) to the mobile terminal 6. The SEP identifies the Control Protocol Redirector 8 to which the mobile terminal 6 is to then send the authorised request for service. Accordingly, the mobile terminal 6 sends (step e) that request.

Upon receiving that request, which identifies the user terminal, the control protocol redirector 8 looks up (step f), in real time in the RDBMS (which can be considered a metadata store), a list of candidate CoD servers 12 to provide the service to the user terminal, and selects the apparently most suitable.

Selection of CoD Server

A simple approach used to select which CoD server to request to address a particular service request, is to assume that more than one CoD server can possibly provide the requested service to a user terminal 6, but that each CoD server has an associated weighting as to its desirability for handling requests from particular geographical locations. For example, a list is stored of the order in which servers might preferably serve the user terminal 6, based on e.g. proximity of server to user terminal's current location. The control protocol redirector 8 works down the list until a CoD server is identified that currently has the resources available to provide the requested service.

In particular, the first server on the list is requested (step g) to reserve the network resources required to provide the service. This request is received by the Resource and Admission Controller, RAC, 14 in the addressed server 12.

Figure 4:
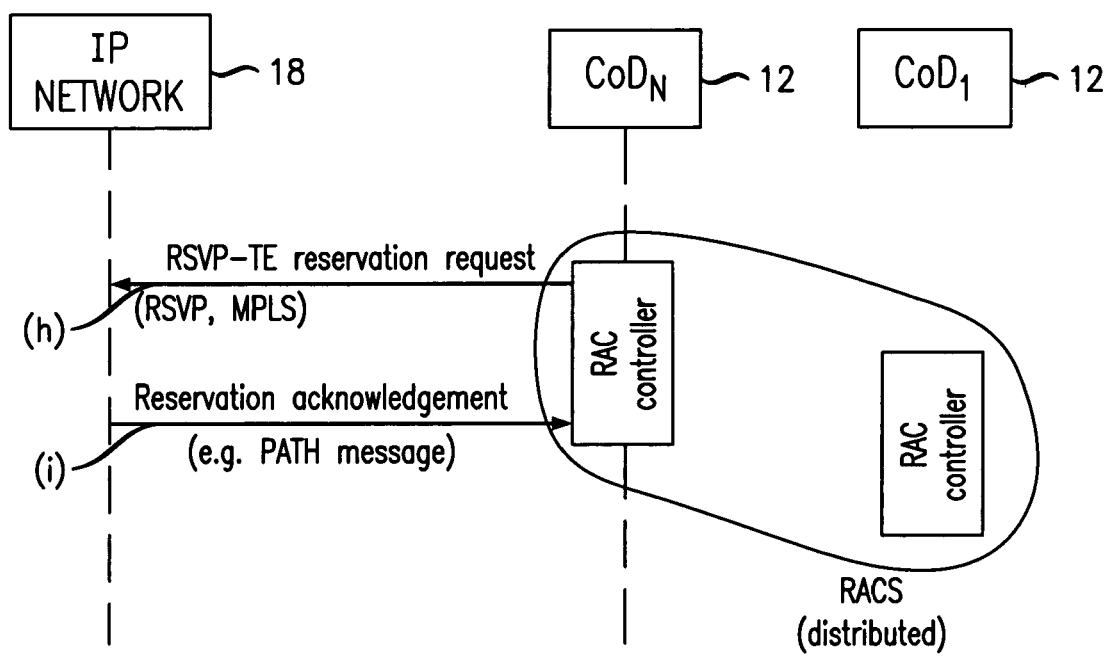
FIG. 4 is a further message sequence diagram showing more detail of how resources are reserved in the network shown in FIG. 2.

As shown in FIG. 4, the RAC controller 14 seeks to create a labelled path using known Resource reSerVation Protocol-Traffic Engineering (RSVP-TE protocol) so as to reserve the appropriate resources of the Internet Protocol network 18 via which the content is sent to the user terminal 6. As shown in that Figure, this is done by the selected CoD server 12 sending (step h) an RSVP-TE reservation request message into the IP network 18 where corresponding PATH and RES messages between hops between the user terminal 6 and server 12 are sought to be set up. If successful resource reservation occurs, a reservation acknowledgement message (PATH message) in reply (step i) to the RAC controller 14 in the server 12.

Referring back to FIG. 3, imagine say that reservation was not successful for the first server on the list. Accordingly, the control protocol redirector 8 is informed (step j) that that particular server was unable to make the network resource reservation. Accordingly, the control protocol redirector 8 sends (step k) to the next CoD server in the list a request to reserve the network resources required.

This process is repeated, working down the list of servers, until a server successfully effects the network resource reservation. Imagine it is for the nth server on the list (where n is a positive integer, e.g. 2) that a successful resource reservation occurs. A reservation acknowledgement message (PATH message) is sent (step i) from the IP network 18 to the RAC controller 14 in the server 12. The RAC controller 14 in this nth server 12 then sends (step l) a positive acknowledgement that resources were reserved to the control protocol redirector 8.

The control protocol redirector 8 then sends (step m) an instruction to the user terminal 6 to request service from the particular server 12 which successfully reserved the resources. In other words, the control protocol redirector 8 returns the address of the CoD server, which will deliver the content to the user terminal 8.

The user terminal 12 then sends (step n) a request for service to the CoD server which will deliver the content. That CoD server responds (step o) to the user terminal 12 by delivering the requested video service, such as a data stream of a selected movie.

Another Example System

In an alternative embodiment, otherwise similar to that described in relation to FIGS. 2 to 4 above, the list of CoD servers to be considered for a service request is adaptively reordered to additionally take into account, for each CoD server, the time since last failure and time taken to rectify the failure. A failure is a failure of the CoD server itself or the network connection between that CoD server and the user terminal. For example, a CoD server for which it is quick to rectify a failure and has not experienced a failure recently may be preferred over another. In mathematical terms, if $$\sum_{k=1}^{N} w_k = 1,$$

where $w_k$ is a weight denoting a preference (i.e. probability) for selecting k-th CoD server, then the next CoD server l is, for example, selected according to the following equation:

$$l = \underset{k}{\text{MAX}} \left\{ \frac{w_k}{\sum_{n=1}^{n \in (\Delta t_n < \Delta T)} \frac{\Delta T - \Delta t_n}{\Delta T}} \right\},$$

where $w_k$—is a weight for selecting k-th CoD server, $\Delta T$—average time to rectify failure, $\Delta t_n$—time from the n-th recoded failure on the k-th CoD server.

For example, let's say we have three video servers CoD1, CoD2 and CoD3 currently available with associated weights of 0.5 for CoD1, 0.3 for CoD2, and 0.2 for CoD3. This means that ignoring other factors, the highest preference is for CoD1 and the lowest preference is for CoD3, among the CoD servers on the list, and accordingly, CoD1 will be selected if it has sufficient resources. However, in addition to consideration of these weights, the number of intermittent network failures is monitored and considered as part of CoD server selection. We know that it takes on average $\Delta T$ to rectify a genuine failure. However, let's assume that there are a number of intermittent short term failures due to network glitches all resolve in less than $\Delta T$. For example, let's say $\Delta T = 5$ hours, and three intermittent short term failures for CoD1 have been reported, with times since failure of 1 h, 2 h and 3 hours.

Then using the equation, the initial weight for CoD1 is adjusted following:

$$l = \underset{k}{\text{MAX}} \left\{ \frac{w_k}{\sum_{n=1}^{n \in (\Delta t_n < \Delta T)} \frac{\Delta T - \Delta t_n}{\Delta T}} \right\},$$

the weight for CoD1 becoming $$\frac{0.5}{\left(\frac{5-1}{5}\right)+\left(\frac{5-2}{5}\right)+\left(\frac{5-3}{5}\right)} = 0.27$$

This means that in the presence of those intermittent failures, server CoD1 no longer has the highest weight and server CoD2, which has a weight of 0.3, would be selected instead.

Another Example System

Figure 5:
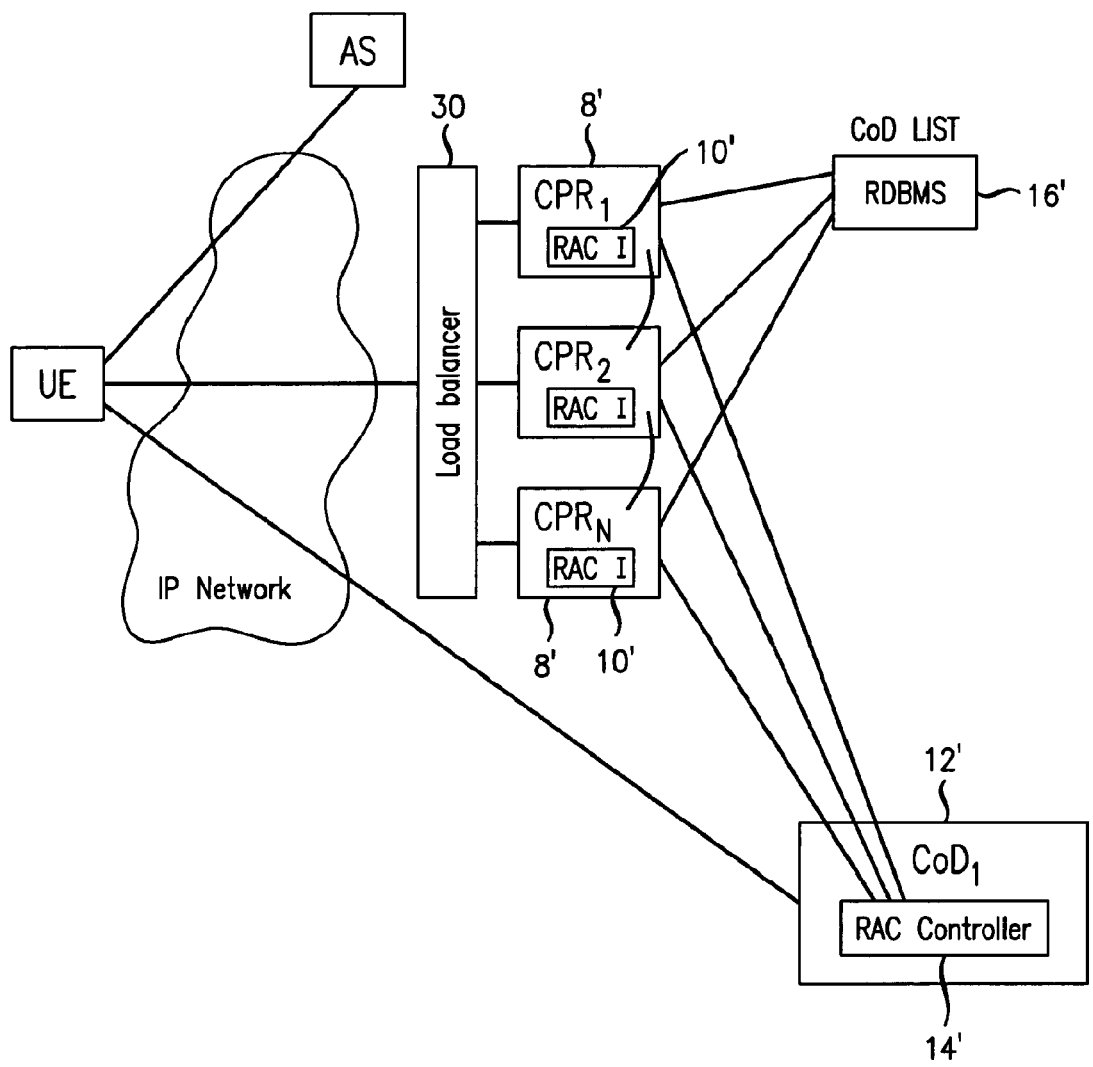
FIG. 5 is a diagram illustrating a network for interactive IPTV services according to a second embodiment of the present invention.

As shown in FIG. 5, another embodiment, otherwise similar to that shown in FIG. 2, includes a load balancer stage 30 connected between the user terminal and control protocol redirector 8'. Also there are multiple instances of the control protocol redirector 8', which are distributed over different locations or, in an alternative embodiment, localized near the load balancer 30 stage. The redirectors 8' each include a RAC interface 10' for connection to RAC controllers 14' in CoD servers 12'. The redirectors need no specific knowledge of the location of CoD servers. The CoD servers 12' automatically and adaptively register or de-register in the CoD list in RDBMS storage 16'.

Some Further Options

In some other embodiments, other techniques for reserving resources in networks instead of RSVP-TE protocol can be used, for example MultiProtocol Label Switching MPLS.

General

The example embodiments detailed above can be considered as dedicated IPTV sub-systems of a network (such as a so-called Next Generation Network, NGN). Some alternative embodiments are Internet protocol Multimedia Subsystem (IMS)-based IPTV systems in which resource reservation and admission control is instead done by call setup control functions. Video can be for example films, clips, pictures or slide shows. In some embodiments content other than video, for example audio, or other multimedia can be provided.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of providing a content-on-demand service to a user terminal in a system comprising a plurality of content-on-demand servers and a packet-switched network, the method comprising:
    a first of the content-on-demand (CoD) servers seeking to reserve packet switched network resources to enable service delivery to the user terminal by seeking to set up a path with sufficient resources through the network,
    said first server sending a message indicating that resource reservation was insufficient,
    thereafter a further of the content-on-demand servers seeking to resource packet-switched network resources to enable service provision to the user terminal by seeking to set a path with sufficient resources through the network,
    the further server receiving a reservation acknowledgment;
    said further server sending a message indicating that resource reservation is sufficient, and
    said further server providing the content to the user terminal via the packet-switched network;
    in which a further controller uses a list of candidate content-on-demand servers to determine a sequence in which the content-on-demand servers are to be requested to seek to reserve resources, the further controller requesting in turn the servers to reserve resources and to send a message indicating whether resource reservation was sufficient, until one reports that resource reservation is sufficient
    and in which each server has an associated coverage area, and the first server is selected dependent upon in which coverage area the user terminal requesting the service currently resides.

2. The method according to claim 1, in which the content comprises video.

3. A method of providing a content-on-demand service to a user terminal in a system comprising a plurality of content-on-demand servers and a packet-switched network, the method comprising:
    a first of the content-on-demand servers seeking to reserve packet switched network resources to enable service delivery to the user terminal by seeking to set up a path with sufficient resources through the network,
    said first server sending a message indicating that resource reservation was insufficient,
    thereafter a further of the content-on-demand servers seeking to resource packet-switched network resources to enable service provision to the user terminal by seeking to set a path with sufficient resources through the network,
    the further server receiving a reservation acknowledgment;
    said further server sending a message indicating that resource reservation is sufficient, and
    said further server providing the content to the user terminal via the packet-switched network;
    in which a further controller uses a list of candidate content-on-demand servers to determine a sequence in which the content-on-demand servers are to be requested to seek to reserve resources, the further controller requesting in turn the servers to reserve resources and to send a message indicating whether resource reservation was sufficient, until one reports that resource reservation is sufficient
    and in which the list is selected dependent upon in which coverage area the user terminal requesting the service currently resides.

4. A method of providing a content-on-demand service to a user terminal in a system comprising a plurality of content-on-demand servers and a packet-switched network, the method comprising:
    a first of the content-on-demand servers seeking to reserve packet switched network resources to enable service delivery to the user terminal by seeking to set up a path with sufficient resources through the network,
    said first server sending a message indicating that resource reservation was insufficient,
    thereafter a further of the content-on-demand servers seeking to resource packet-switched network resources to enable service provision to the user terminal by seeking to set a path with sufficient resources through the network,
    the further server receiving a reservation acknowledgment;
    said further server sending a message indicating that resource reservation is sufficient, and
    said further server providing the content to the user terminal via the packet-switched network;
    in which a further controller uses a list of candidate content-on-demand servers to determine a sequence in which the content-on-demand servers are to be requested to seek to reserve resources, the further controller requesting in turn the servers to reserve resources and to send a message indicating whether resource reservation was sufficient, until one reports that resource reservation is sufficient and in which the sequence is dependent on information as to previous failures associated with CoD servers referred to in the list.

5. The method according to claim 4, in which the sequence is dependent on time since last failure.

6. A system for content-on-demand services, the system comprising:
   a plurality of content-on-demand servers and a packet-switched network;
   at least two content-on-demand servers of the plurality being candidates to provide content addressed to a user terminal in response to a request for that content from the user terminal;
   wherein each candidate content-on-demand server includes a resource reservation stage which is a Resource and Admission Control, RAC, controller operative to seek to reserve resource of the network so as to enable content delivery by that content-on-demand server by seeking to set up a path with sufficient resources through the network;
   the packet-switched network being configured to send a reservation acknowledgement to the candidate content-on-demand server which sets up a path with sufficient resources through the network; and
   a further controller that is operative to inspect a list of candidate content-on-demand servers, to determine a sequence in which the servers are to seek to reserve resources and to send a message indicating whether resource reservation was sufficient, the further controller in use requesting in turn the servers to reserve resources and to send a message indicating whether resource reservation was sufficient, until one of the servers reports that resource reservation is sufficient and in which the further controller is also operative to select the list, from among a plurality of lists, dependent upon in which coverage area the user terminal requesting the service currently resides.

7. The system according to claim 6, in which the content comprises video.

8. The system according to claim 6, in which the further controller is a control protocol redirector to which the user terminal sends an authorised service request.

9. The system according to claim 6, further comprising a Relational DataBase Management System in which the list is stored.

10. A content-on-demand server comprising:
   a storage of digital video content;
   a Resource and Admission Control (RAC) controller that is operative to receive, from an associated control protocol redirector, a request to reserve network resources to set up a path between the content-on-demand server and a user terminal so as to enable content delivery by the content-on-demand-server to the user terminal, transmit a resource reservation request message in response to the received request to reserve resources, receive a reservation acknowledgement message and transmit a message to the associated control protocol redirector indicating that the reservation request was successful, if the transmitted request was successful in reserving the resources, and receive a reservation failure message and transmit a message to the associated control protocol redirector indicating that the reservation request failed, if the transmitted request is not successful in reserving the resources; and
   an interface that is operative to receive a request for service from the user terminal and to transmit video service including data from the digital video content storage to the user terminal over the reserved resources, if the transmitted request was successful in reserving the resources;
   wherein at least one of: the content-on-demand server, in use, has an associated coverage area, and the content-on-demand is selected dependent upon in which coverage area the user terminal requesting the service currently resides; in use, the content-on-demand server is selected based on information as to previous failures associated with content-on-demand servers referred to in a list of candidate content-on-demand servers; and a list from which the content-on-demand server is selected, is selected from among a plurality of lists, dependent upon in which coverage area the user terminal requesting the service currently resides.

11. A system for content-on-demand services, the system comprising:
   a plurality of content-on-demand servers and a packet-switched network;
   at least two content-on-demand servers of the plurality being candidates to provide content addressed to a user terminal in response to a request for that content from the user terminal;
   wherein each candidate content-on-demand server includes a resource reservation stage which is a Resource and Admission Control, RAC, controller operative to seek to reserve resource of the network so as to enable content delivery by that content-on-demand server by seeking to set up a path with sufficient resources through the network;
   the packet-switched network being configured to send a reservation acknowledgement to the candidate content-on-demand server which sets up a path with sufficient resources through the network; and
   a further controller that is operative to inspect a list of candidate content-on-demand servers, to determine a sequence in which the servers are to seek to reserve resources and to send a message indicating whether resource reservation was sufficient, the further controller in use requesting in turn the servers to reserve resources and to send a message indicating whether resource reservation was sufficient, until one of the servers reports that resource reservation is sufficient and in which the further controller is operative to select the list dependent upon in which coverage area the user terminal requesting the service currently resides.

12. A system for content-on-demand services, the system comprising:
   a plurality of content-on-demand servers and a packet-switched network;
   at least two content-on-demand servers of the plurality being candidates to provide content addressed to a user terminal in response to a request for that content from the user terminal;
   wherein each candidate content-on-demand server includes a resource reservation stage which is a Resource and Admission Control, RAC, controller operative to seek to reserve resource of the network so as to enable content delivery by that content-on-demand server by seeking to set up a path with sufficient resources through the network;

the packet-switched network being configured to send a reservation acknowledgement to the candidate content-on-demand server which sets up a path with sufficient resources through the network; and a further controller that is operative to inspect a list of candidate content-on-demand servers, to determine a sequence in which the servers are to seek to reserve resources and to send a message indicating whether resource reservation was sufficient, the further controller in use requesting in turn the servers to reserve resources and to send a message indicating whether resource reservation was sufficient, until one of the servers reports that resource reservation is sufficient wherein the further controller determines the sequence in a manner that is dependent on information as to previous failures associated with CoD servers referred to in the list.

13. A Control Protocol Redirector controller that is operative to provide a content-on-demand service to a user terminal in a system comprising a plurality of associated content-on-demand servers and a packet-switched network, the controller being operative to inspect a list of candidate content-on-demand servers of the plurality, to determine a sequence in which the servers are to seek to reserve resources, the controller in use requesting in turn the servers to reserve resources and to send a message indicating whether resource reservation was sufficient, until one of the servers reports that resource reservation is sufficient and wherein at least one of: each associated server has an associated coverage area, and a first server is selected dependent upon in which coverage area the user terminal requesting the service currently resides, the sequence is determined based on information as to previous failures associated with content-on-demand servers referred to in the list and the list is selected, from among a plurality of lists, dependent upon in which coverage area the user terminal requesting the service currently resides.

14. A method that is operative to provide a content-on-demand service to a user terminal in a system comprising a plurality of associated content-on-demand servers and a packet-switched network, the method comprising:

receiving, by the controller a request for service from the user terminal;

inspecting, by the controller, a list of candidate content-on-demand servers of the plurality of associated content-on-demand servers, to determine a sequence in which the servers are to seek to reserve resources for providing the requested service; and requesting in turn the servers to reserve resources and to send a message indicating whether resource reservation was sufficient, until one of the servers reports that resource reservation is sufficient;

wherein at least one of: each associated server has an associated coverage area, and a first server is selected through the inspecting dependent upon in which coverage area the user terminal requesting the service currently resides, the sequence is determined based on information as to previous failures associated with content-on-demand servers referred to in the list and the list is selected, from among a plurality of lists, dependent upon in which coverage area the user terminal requesting the service currently resides.

* * * * *